(12) United States Patent
Wenzel

(10) Patent No.: US 6,925,297 B2
(45) Date of Patent: Aug. 2, 2005

(54) USE OF AAA PROTOCOLS FOR AUTHENTICATION OF PHYSICAL DEVICES IN IP NETWORKS

(75) Inventor: Peter Wenzel, Plano, TX (US)

(73) Assignee: Nortel Networks, Limited, St. Laurent (CA)

( * ) Notice: Subject to any disclaimer, the term of this patent is extended or adjusted under 35 U.S.C. 154(b) by 626 days.

(21) Appl. No.: 09/956,862

(22) Filed: Sep. 19, 2001

(65) Prior Publication Data

US 2002/0034939 A1 Mar. 21, 2002

Related U.S. Application Data

(60) Provisional application No. 60/233,552, filed on Sep. 19, 2000.

(51) Int. Cl.[7] .................................................. H04M 3/16
(52) U.S. Cl. ...................... 455/411; 455/426.1; 455/379; 455/93.02
(58) Field of Search ............................... 455/411, 426.1, 455/426; 709/230, 231; 713/201, 202; 380/247, 248; 379/93.02, 93.03

(56) References Cited

U.S. PATENT DOCUMENTS 5,557,654 A * 9/1996 Maenpaa ..................... 455/411

6,704,789 B1 * 3/2004 Ala-Laurila et al. ........ 709/230

FOREIGN PATENT DOCUMENTS

| GB | 2279541 A | * | 1/1995 | ............ H04L/9/32 |
| JP | 410215488 A | * | 8/1998 | ............ H04Q/7/38 |

* cited by examiner

Primary Examiner—Melur Ramakrishnaiah
(74) Attorney, Agent, or Firm—Garlick Harrison & Markinson, LLP; James A. Harrison; Bruce E. Garlick

(57) ABSTRACT

A 1xEVDO network includes an access terminal that generates an access terminal ID as a part of the call setup signals it generates when setting up a data call. In order to determine whether the user ID is authorized to access the 1xEVDO wireless data network, a AAA server is formed to include a table that identifies authorized access terminals, by access terminal ID, for access to the 1xEVDO wireless data packet network. In one embodiment of the present invention, the wireless access terminal also is formed to perform an algorithmic calculation upon a received random number and to produce the results to an access network controller. The AAA server, then, is formed to determine whether the results produced by the access terminal are correct. In one embodiment of the invention, the AAA server is formed to perform the same algorithmic calculation. In another embodiment of the invention, the AAA server is formed to compare the received results from the access terminal's algorithmic calculation to a value stored in memory.

22 Claims, 4 Drawing Sheets

USE OF AAA PROTOCOLS FOR AUTHENTICATION OF PHYSICAL DEVICES IN IP NETWORKS

CROSS REFERENCE TO RELATED APPLICATIONS

This application incorporates by reference, and claims priority to, a U.S. Provisional Application for Patent filed on Sep. 19, 2000, and having a Ser. No. 60/233,552 and a title of Use of AAA Protocols for Authentication of Physical Devices in Third Generation IP Networks.

BACKGROUND OF THE INVENTION

1. Technical Field

The present invention relates to mobile communication devices and, more particularly, the present invention relates to mobile terminals capable of communicating in a data-only mode with a data network.

2. Related Art

Wireless communication service providers, as well as Internet service providers, face some difficult challenges as the various networks are increasingly modified to work together to provide seamless end-to-end call connectivity across the various platforms. Ever-increasing residential dial-up subscribers demand available modem (or ISDN) ports, or threaten to take their business elsewhere. To meet this demand, Internet service providers are deploying a large number of complex, port-dense network access servers (NAS) to handle thousands of individual dial-up connections.

The various types of service providers must protect against theft-of-service attacks by unscrupulous individuals with excess free time; they must verify subscribers' levels of access authorization; and for cost recovery, billing, and resource planning purposes, they may need to meter the connection time to the network. Furthermore, to provide maximum coverage to a growing roaming and mobile subscriber base, they may choose to pool their resources while retaining control over their subscribers' access, usage, and billing information. All these services require coordination between the various administrative systems supported by the dial-up providers in partnership with each other.

Traditional wireless mobile networks include Mobile Station Controllers (MSCs), Base Station Controllers (BSCs) and Base Transceiver Station Systems (BTSs) that jointly operate to communicate with mobile stations over a wireless communication link. Examples of common networks include Global System for Mobile Communications (GSM) networks, Time Division Multiple Access (TDMA) networks and Code Division Multiple Access (CDMA) networks. Extensive infrastructures (e.g., ANSI-41 or MAP-based networks) exist in the cellular wireless networks for tracking mobility, distributing subscriber profiles, and authenticating physical devices.

To establish a wireless communication link, an MSC communicates with a BSC to prompt the BTS (collectively "Base Station" or "BS") to generate paging signals to a specified mobile station within a defined service area typically known as a cell or sector (a cell portion). The mobile station, upon receiving the page request, responds to indicate that it is present and available to accept an incoming call. Thereafter, the BS, upon receiving a page response from the mobile station, communicates with the MSC to advise it of the same. The call is then routed through the BS to the mobile station as the call setup is completed and the communication link is created. Alternatively, to establish a call, a mobile station generates call setup signals that are processed by various network elements in a synchronized manner to authenticate the user as a part of placing the call. The authentication process includes, for example, communicating with a home location register (HLR) to obtain user and terminal profile information.

Next generation cellular networks that are presently being developed are being modified from traditional systems to create the ability for mobile stations to receive data. For example, many new mobile stations, often referred to as mobile terminals, are being developed to enable a user to surf the web or send and receive e-mail messages through the wireless mobile terminal. Accordingly, different systems and networks are being developed to develop such a capability and improve their operational characteristics. One example of a system that is presently being deployed with voice and data capabilities is the CDMA 2000 network. The CDMA 2000 network, however, is optimized for voice transmissions as it grew out of a voice network (IS-95A) and therefore is not optimized for transmitting data. More formally, the 1xRTT Standard defines CDMA operation.

One data-only network that is being developed is defined by the 1xEVDO standard. The 1xEVDO standard defines a timeburst system utilizing a 1.25 MHz carrier that is set at a carrier frequency that is adjacent to the frequencies used by the voice networks. In one particular network, a 1.67 millisecond (mS) burst is used for the forward link in the 1xEVDO network. The 1xEVDO standard data-only network is optimized for streaming video and other such data applications. The next generation of CDMA networks that are being deployed can communicate with voice and data networks but do not process data as efficiently as the networks formed according to the 1xEVDO Standard as well as other data standards.

The data-only 1xEVDO networks that have been previously described are not formed to interact seamlessly between the voice and data networks. Moreover, the data-only 1xEVDO networks do not have or utilize signaling system number seven (SS7) network components to assist with call setup, user and mobile station authentication, call routing, and feature delivery. The 1xEVDO networks are formed to carry data only and are not intended to include features and capabilities of wireless voice networks. The infrastructure of the 1xEVDO network is different and simpler than SS7 based voice networks (wireline or wireless).

Accordingly, present mobile terminals only provide some of these traditional voice network features and, in some cases, only in a rudimentary way. For example, the designs in the 1xEVDO standards only provide for user authentication, not terminal authentication. Thus, as in the days of older and archaic wireless voice networks, the inability to authenticate an access terminal or mobile terminal facilitates fraudulent activity by those that are so inclined. Moreover, without the ability of a network to authenticate the identity of a terminal that is using network resources, billing becomes more complicated and less reliable. Because traditional SS7 network components are not available, however, the infrastructure in the 1xEVDO networks do not support terminal identification. A need exists, therefore, for a system and method within a wireless data networks such as a 1xEVDO network, to authenticate the access terminal that is utilizing network resources.

SUMMARY OF THE INVENTION

An Authentication, Authorization and Accounting (AAA) server is one that ordinarily provides access to a given Internet type of wireline data packet network. In the described embodiment of the invention, the AAA server is also formed to communicate with a 1xEVDO network element using AAA protocols to authenticate a physical device (e.g., an access terminal) seeking access to the wireless data packet network. More specifically, the described access network-AAA (AN-AAA) server is formed to receive an access terminal ID for a mobile access terminal of an 1xEVDO wireless data packet network to determine whether access should be granted for the access terminal requesting access. In one embodiment of the described invention, the AN-AAA server includes a memory that stores a table that maps access terminal IDs to a given 1xEVDO wireless data packet network. Accordingly, upon receiving the access terminal ID, the AN-AAA server determines whether it is a subscriber to the service and whether access can be granted. Additionally, the access terminal ID may be transmitted to a billing server that monitors the data packet network, including throughput or data thereon, for billing purposes. In the described embodiment, a local AAA server is used also to validate the user name prior to granting access. Thus, the invention, in one embodiment, includes an AN-AAA server as well as a local AAA server.

In the past, the wireless user data networks that are being contemplated, especially the 1xEVDO networks, have only provided for network access according to user IDs. More specifically, access is predicated upon the receipt of a user name. This is of concern because user names may be fraudulently duplicated, thereby resulting in the (actual, not registered) user escaping without paying for the services rendered. Thus, the present invention allows for a higher level of authorization and user verification.

In another embodiment of the present invention, the AN-AAA server not only includes a memory that stores a table of user IDs, but also includes logic that defines algorithmic functions or calculations that are to be performed on random numbers. For this embodiment of the invention, the AN-AAA server not only examines the access terminal ID, but also performs an algorithmic calculation on a random number (a random "challenge value") that was received from an access network controller (ANC) to determine a result.

The result(s), or computed authenticator(s), of this algorithmic calculation is/are compared to a number (a terminal generated and computed authenticator) received from the ANC. The number received from the ANC is the result of the same type of algorithmic calculation performed by the access terminal when the same random number was transmitted to it by the access network controller. Accordingly, a heightened level of access control is provided in that an access terminal seeking access must not only have the correct user name and the correct access terminal ID, but must also provide the correct results (computed authenticators) for an algorithmic calculation performed on a random number (challenge value). Thus, the AN-AAA server includes the logic to make such determinations to determine if there is a match on all three counts (user name, terminal ID and calculation).

In one embodiment of the invention, the AN-AAA server includes logic for performing the algorithmic calculations. In an alternate embodiment of the invention, the memory that stores the table ID described before further stores expected results for the algorithmic calculation performed by the access terminal. Accordingly, in this embodiment of the invention, the received algorithmic calculation results from the access terminal are compared to a static value stored in a table within memory.

An access terminal, according to the present embodiment of the invention for a 1xEVDO network, is formed to not only generate an access terminal ID as a part of establishing a call or requesting that a data call be set up, but also includes logic that defines an algorithmic calculation that is to be performed upon a received random number, which random number is received from an access network controller. Accordingly, for one embodiment of the invention, the access terminal merely generates an access terminal ID that is used in conjunction with a user name by 1xEVDO network components and/or by an AN-AAA server for determining whether access should be granted. In an alternate embodiment of the invention, however, the access terminal also performs an algorithmic calculation based upon the received random number and produces that to the access network controller as a part of establishing authorization to access the 1xEVDO wireless data network.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Meeting these aforementioned challenges in a simplified and scalable manner for wireless 1xEVDO networks is necessary for implementing a data-only wireless network that avoids fraud and supports proper billing for resource usage. In accordance with these goals, a 1xEVDO network is formed to include an Authentication, Authorization, and Accounting (AAA) server utilizing a AAA protocol. Generally, AAA protocols and servers essentially define a framework for coordinating these individual disciplines across multiple network technologies and platforms. In practice, an AAA server with a database of user profiles and configuration data communicates with AAA clients residing on network components, such as NAS and routers, to provide distributed AAA services.

Authentication involves validating the end users' identity prior to permitting them network access. This process keys on the notion that the end-user possesses a unique piece of information—(a username/password combination, a secret key, or perhaps biometric data, such as fingerprints, for example) that serves as unambiguous identification credentials. The AAA server compares the user-supplied authentication data with the user-associated data stored in its database, and if the credentials match, the user is granted network access. An authentication failure results in a denial of network access.

Authorization defines what rights and services the end user is allowed once network access is granted. This might include providing an IP address, invoking a filter to determine which applications or protocols are supported, and so on. Authentication and authorization are usually performed together in an AAA-managed environment. Accounting (the third "A"), provides the methodology for collecting information about the end user's resource consumption, which can then be processed for billing, auditing, and capacity-planning purposes.

The AAA server is attached to a 1xEVDO network in the described embodiment of the invention and serves as a central repository for storing and distributing AAA information. The device acting as the point of entry into the network is typically a NAS (although it could also be a router, a terminal server, or perhaps another host) that contains an AAA client function.

An AAA server can act as a centralized administrative control point for multiple AAA clients contained within different vendor-sourced NAS and network components. Thus, AAA functions can be added to the server, and incrementally to the client, without disrupting existing network functions. There is no need to incur the operational burden of placing AAA information on the NAS itself.

Figure 1:
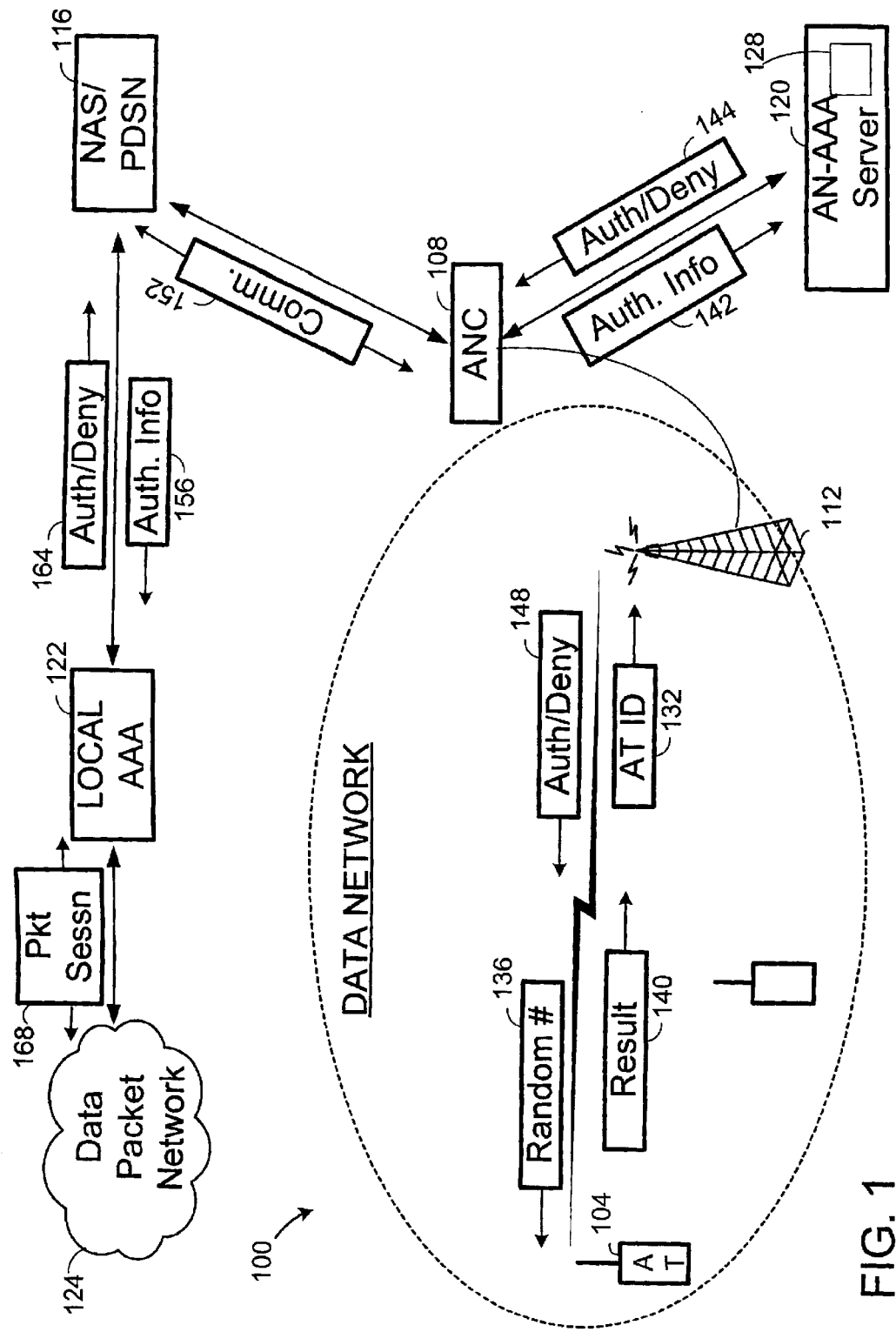
FIG. 1 is a communication network that illustrates one embodiment of a data network for third generation wireless data networks.

Along these lines, FIG. 1 is a communication network that illustrates one embodiment of a data network for third generation wireless data networks. Referring now to FIG. 1, a mobile access terminal 104 is coupled to communicate with an access network controller (ANC) 108 by way of a tower 112. Access network controller 108 is coupled to communicate with a network access server/packet data service node (NAS/PDSN) 116 and an AN-AAA server 120. NAS/PDSN 116 further is coupled to a data packet network 124 by way of a local AAA server 122. It is the data packet network 124 that transports communication signals from a user device (e.g., a notebook computer) that is connected to access terminal 104 to a terminal (not shown here) coupled to data packet network 124. NAS/PDSN 116 is not only for coupling the data packet network for access terminal 104 to a global or local data packet network 124, but also for controlling access from data packet network 124 to access terminal 104.

As suggested before, AN-AAA server 120 is for authenticating the identity of an access terminal 104 (and other physical devices) that seek access to data packet network 124 through the wireless data network 100 and from data packet network 124 through wireless data network 100 to access terminal 104. Thus, while the NAS/PDSN 116 makes final determinations as to whether a connection may be established in either direction, AN-AAA server 120 performs the preliminary authentication based upon the access terminal ID 132 and makes a determination that is relied upon by the NAS/PDSN 116 in determining whether to establish a connection.

AN-AAA server 120 further includes a memory 128 that is for storing a table that maps access terminal ID 132 information to a list of authorized access terminal IDs. Additionally, AN-AAA server 120 includes computer instructions in memory 128 that define operational logic that processes authentication information generated by access terminal 104 to determine validity and to verify the received access terminal ID 132 information.

In operation, whenever access terminal 104 seeks to establish a data call, it generates call setup signals to ANC 108, which call setup signals include access terminal ID 132. The call setup signals include access terminal ID information and, perhaps, user name information. In the one embodiment of the invention, the present invention is implemented in a code division multiple access network in which the call set up signals are formed to include a definition of the vendor type, vendor length and value. Each of these parameters collectively form the terminal ID. Thus, the AN-AAA server performs a lookup in its internal table(s) to verify the aforementioned ID information as a part of determining whether a terminal should be given access to resources of the 1xEVDO wireless data-only network.

ANC 108 responds by transmitting a random number 136 to access terminal 104 upon which access terminal 104 performs an algorithmic operation to produce a result. The result 140 is then transmitted from access terminal 104 by way of tower 112 to ANC 108. ANC 108 then transmits access terminal ID 132 information and the result 140 information in authorization information signal 142 to AN-AAA server 120. ANC 108 also transmits user name information to NAS/PDSN 116. In one embodiment of the present invention, ANC 108 receives the user name from access terminal 104. In another embodiment of the present invention, ANC 108 includes a memory for storing a table that relates access terminal ID information to user name information. In the described embodiment of the invention, however, the user name is received from access terminal 104.

AN-AAA server 120, upon receiving the result information from access terminal 104, as well as access terminal 132 and random number 136, determines whether that result is a valid result. In the described embodiment of the invention, ANC 108 transmits the same random number 136 to AN-AAA server 120 that it transmitted to access terminal 104. AN-AAA server 120, by including logic to perform an algorithmic operation similar to access terminal 104, is able to determine whether the result received from access terminal 104 is accurate. It is understood that the accurate result depends on the identity of the mobile access terminal.

Accordingly, AN-AAA server 120 examines its own result for the algorithmic operation and compares that result to an expected result that is mapped to the access terminal ID 132 for access terminal 104. Based upon the ID information and the result from the algorithmic calculation that relates to the ID, AN-AAA server 120 generates a signal 144 to ANC 108 to advise it whether access for access terminal 104 should be authorized or denied. ANC 108, upon receiving the authorization or denial instruction from AN-AAA server 120 in signal 144, generates known signals to create a communication link between NAS/PDSN 116 and access terminal 104 to enable them to transmit communication signals 152.

In order to support the above described functionality, access terminal 104 is formed to include logic for receiving the random number 136 generated by ANC 108 and for performing an algorithmic operation thereon. Additionally, access terminal 104 is formed to generate an access terminal ID 132 that is to be transmitted to ANC 108. AN-AAA server 120 is formed to include the same type of algorithmic processing logic, as well as to store a large table that maps access terminal ID information to a list of authorized users and also to a list of expected results when the algorithmic processing occurs for a given random challenge number. Moreover, AN-AAA server 120 is formed to communicate with a NAS/PDSN 116 to advise it whether network resources should be allocated or denied for access terminal 104.

Once a communication link is established between NAS/PSDN 116 and access terminal 104, NAS/PSDN 116 produces authorization information signals 156 to local AAA server 122. The signals 156 include user name, a random value or challenge number, and an access terminal 104-generated result obtained from it performing an algorithmic calculation on the challenge number produced to local AAA server 122. Local AAA server 122 then determines whether the result produced by access terminal 104 is correct for the received user name and produces signal 164 to NAS/PSDN 116 to inform it of whether access is authorized or denied. If authorized, then a data packet session is established and packet session signals 168 are transmitted from a user device connected to access terminal 104 and to a terminal coupled to data packet network 124. If network resources are authorized, ANC 108 communicates with access terminal 104 and network access server 116 to create a communication link through wireless data network 100 to data packet network 124 and ultimately to an access terminal coupled to data packet network 124.

Figure 2:
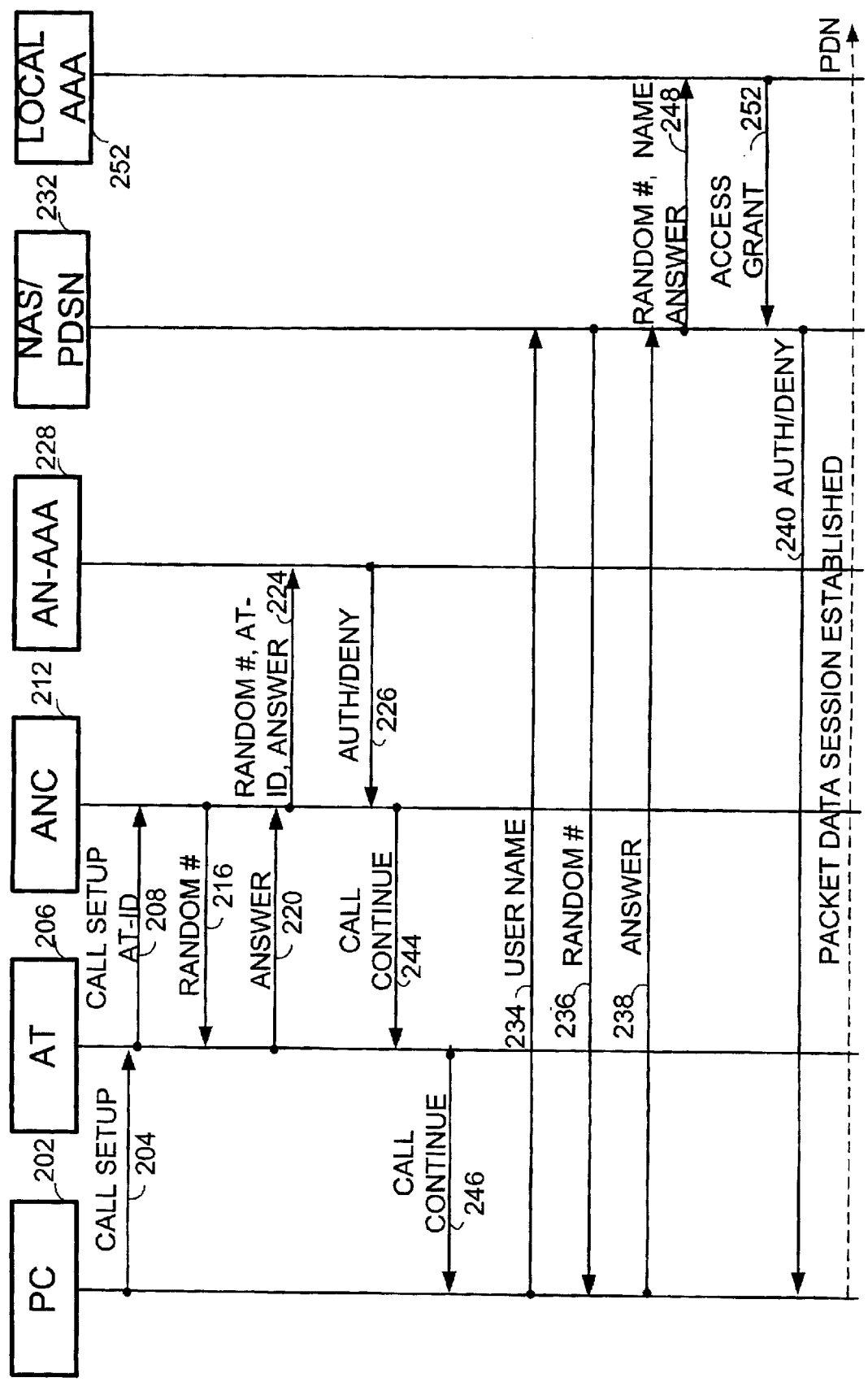
FIG. 2 is a signal sequence diagram that illustrates operation of a wireless data packet network and access terminal according to one embodiment of the present invention.

FIG. 2 is a signal sequence diagram that illustrates operation of a wireless data packet network and access terminal according to one embodiment of the present invention. A user device 202, e.g., a personal computer, personal digital assistant or other similar system, generates call setup signals 204 to access terminal 206. Access terminal 206, transmits call setup signals 208 to access network controller (ANC) 212. The call setup signals 208 include, at a minimum, an access terminal ID. Upon receiving the call setup signals 208, access network controller 212 generates a random number 216 (also known as a challenge value) that is transmitted over a wireless communication link to access terminal 206.

Access terminal 206, upon receiving random number 216, performs an algorithmic operation upon the random number and generates an answer 220 that is transmitted to ANC 212. ANC 212 then transmits the same random number that it generated and transmitted to access terminal 206, as well as the access terminal ID and the access terminal's answer in an authorization request signal 224 that is transmitted to AN-AAA server 228.

AN-AAA server 228, upon receiving the random number, the access terminal ID and the access terminal answer that is within signal 224, also performs an algorithmic calculation on the random number and compares its' calculated answer to the received answer from access terminal 206.

In one embodiment, an algorithmic calculation is selected that corresponds to the received access terminal ID. From the results of the calculation, and from a determination as to whether the results match the results that were expected for access terminal 206, AN-AAA server 228 generates an authorization/deny signal 226 to ANC 212 to inform it of whether access is authorized or denied. ANC 212 then sends a call continue signal 244 to access terminal 206 to instruct it to proceed with call setup. ANC 212 responds by sending a call continue signal 246 to PC 202 to advise it that access was granted. Thereafter, PC 202 generates a user name signal 234 that is transmitted to NAS/PSDN 232. NAS/PSDN 232 responds by generating a random number 236 as a challenge value. PC 202 then provides an answer signal 238 with result from its algorithmic calculation, which answer signal 238 is transmitted back to NAS/PSDN 232.

Once NAS/PSDN 232 has received signals 234, 236 and 238, ir transmits access terminal 206a signal 248 that includes the challenge value, user name and access terminal 206 result or answer to local-AAA server 252. Thereafter, local AAA server 252 generates an access grant/deny signal 252 that is transmitted back to NAS/PSDN 232. NAS/PSDN 232 then transmits authorization/deny signal 240 to PC 202 to inform it as to whether access was granted or denied. Assuming access is granted, a packet data session is then established between PC 202 and an access terminal coupled to a packet data network.

Figure 3:
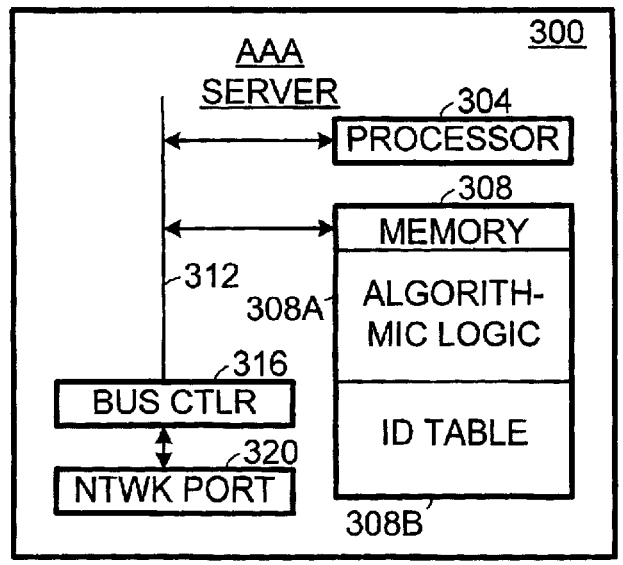
FIG. 3 is a functional block diagram of an AN-AAA server formed according to one embodiment of the present invention.

FIG. 3 is a functional block diagram of an AN-AAA server formed according to one embodiment of the present invention. As may be seen, AN-AAA server 300 includes a processor 304 that is coupled to communicate with a memory 308 by way of a bus 312. Bus 312 further is coupled to a bus controller 316 that controls the synchronization and timing of communications on bus 312. Bus controller 316 further is coupled to a network port 320 to enable AN-AAA server 300 to communicate with external devices. Memory 308 further includes a portion 308A for storing computer instructions that define algorithmic processing logic for calculating a result based upon a specified random number input and a portion 308B for storing computer instructions that define an access terminal ID table for a 1xEVDO wireless data packet network. While not explicitly shown, memory 308 further comprises computer instructions that are executed by processor 304 that relate to standard operation AN-AAA server 300. In one embodiment of this invention, ID table 308B further defines algorithmic processing information that enables AN-AAA server 300 to determine if the results produced by an access terminal correspond to an expected result as a part of authenticating the access terminal ID.

In operation, processor 304 retrieves computer instructions from memory 308 by way of bus 312 for execution. It is the execution of the computer instructions that create the operational logic of AN-AAA server 300 that relates to the access terminal ID information for a given access terminal as defined by the computer instructions within memory portion 308B. The specific operational logic of the various embodiments of the present invention as are described in this application with respect to the described operational logic and operational process steps or methods, are defined within the memory 308. While FIG. 3 illustrates a traditional processor/software design approach, the operational logic may also be implemented in logic designs and in programmable logic designs or in any combination thereof.

Figure 4:
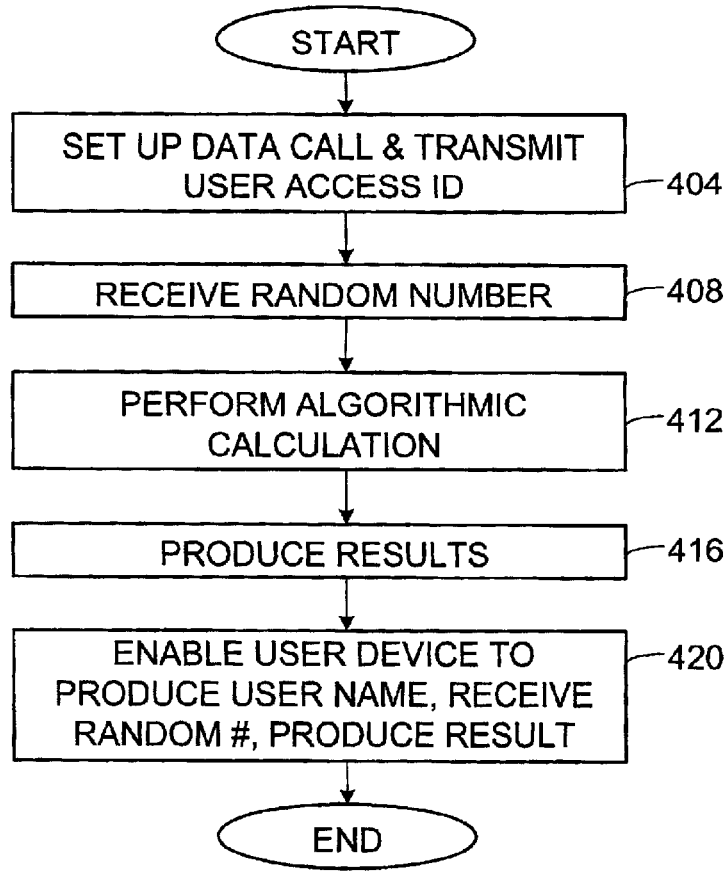
FIG. 4 is a flowchart illustrating a method for setting up a data call that is performed by a wireless user data terminal in a 1xEVDO network according to one embodiment of the present invention.

FIG. 4 is a flowchart illustrating a method for setting up a data call that is performed by a wireless user data terminal in a 1xEVDO network according to one embodiment of the present invention. Initially, a wireless access terminal of the 1xEVDO network generates call setup signals (step 404). The call setup signals not only include the defined call setup signals for 1xEVDO wireless data networks, but also include the transmission of an access terminal ID. Thereafter, the access terminal receives a number that is to be used by it as a challenge number upon which an algorithmic calculation is performed (step 408). As has been explained elsewhere herein, the received number is a random number that was generated from an access network controller. Once the access terminal receives the random number in step 408, it performs a specified algorithmic calculation upon that number (step 412) and produces the results to the ANC (step 416). As is understood, the access terminal transmits the results over a wireless communication link to a tower which then conducts the received signals to the ANC. Additionally, the inventive method herein includes, in one embodiment of the invention, the user device coupled to the access terminal, producing a user ID to an NAS/PSDN to enable it to produce the user name (step 420). This enables the NAS/PDSN to transmit user name, challenge value and result to a local AAA server to enable it to make a final determination regarding access.

Figure 5:
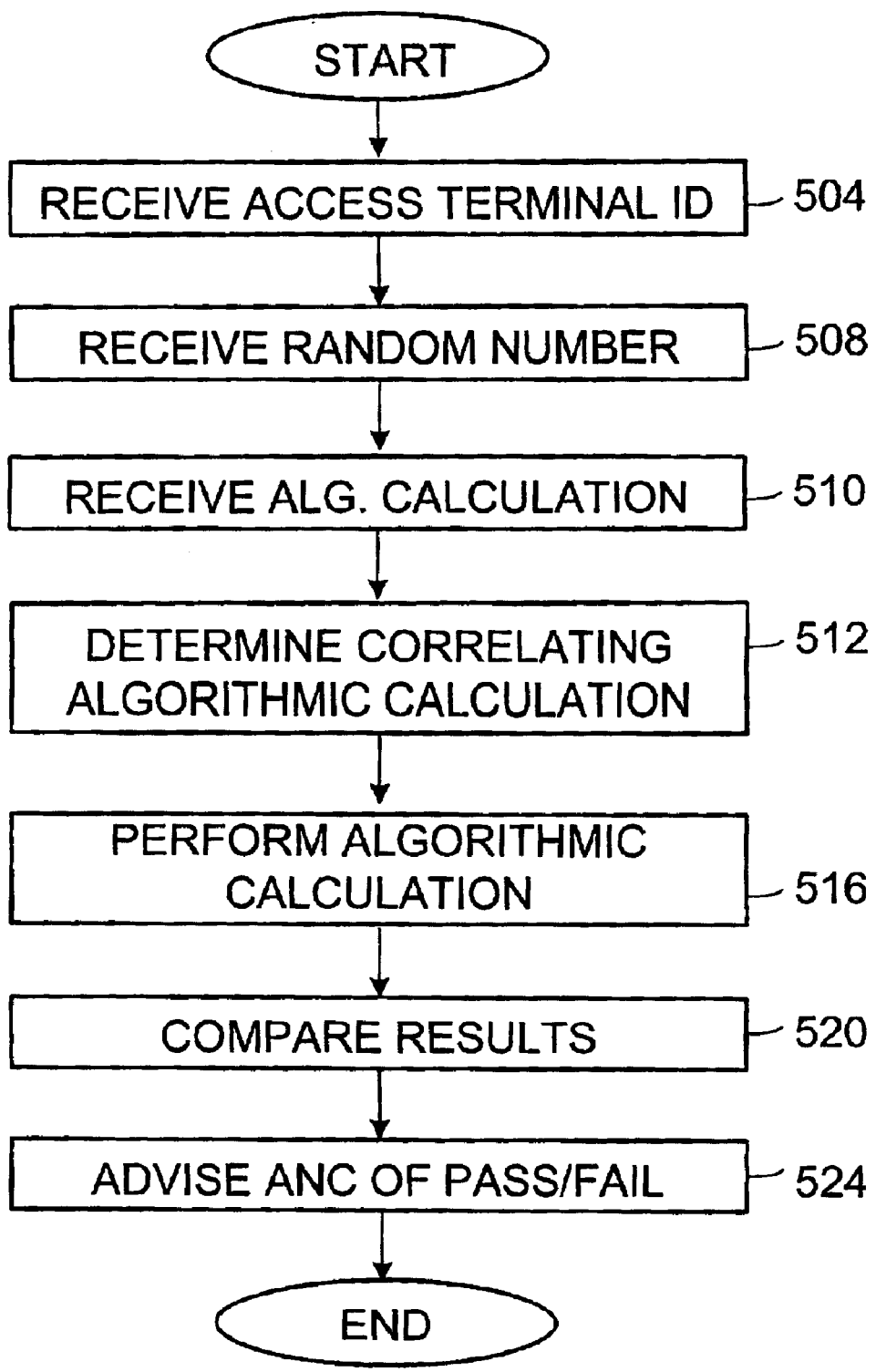
FIG. 5 is a flowchart that illustrates a method performed by an AN-AAA server for determining whether an access terminal in a 1xEVDO network should be allowed access or network resources according to one embodiment of the present invention.

FIG. 5 is a flowchart that illustrates a method performed by an AN-AAA server for determining whether an access terminal in a 1xEVDO network should be allowed access or network resources according to one embodiment of the present invention. Initially, the AN-AAA server receives an access terminal ID and a result of an algorithmic calculation that it performed on a random number (step 504). Thereafter, the AN-AAA server receives the same random number (step 508) that was transmitted to the access terminal for it to use in its algorithmic calculation (step 510). The AN-AAA server must then determine, in one embodiment of the present invention, which algorithmic calculation corresponds to the access terminal ID (step 512). Once it determines the corresponding algorithmic calculation, the AN-AAA server performs the algorithmic calculation (step 516).

After performing the algorithmic calculation, the AN-AAA server compares the results that it calculated to the received results from the access terminal (step 520). Thereafter, the AN-AAA server advises an access network controller whether the results compared favorably or whether they did not compare, meaning the answers were different (step 524).

In effect, the foregoing methods, networks and systems described herein facilitate a process that allows or denies access based on access terminal IDs without requiring the incorporation of traditional SS7 components.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A 1xEVDO network, comprising:
a data only access terminal formed to transmit over a wireless link to an access network controller (ANC) of the 1xEVDO network a user Id stored in non-volatile memory as a part of generating call setup signals;
wherein the ANC generates a random number to the access terminal and wherein the access terminal generates a first calculated answer based upon the random number to the ANC;
wherein the ANC produces the calculated answer, an access terminal ID and the random number to an AN-AAA server formed to include a table of data only access terminal Ids that are allowed access to the 1xEVDO network, which AAA server is coupled to communicate with the access network controller; and
wherein the AN-AAA server responds with one of an authorization or denial of access message to the ANC.

2. The network of claim 1 wherein the ANC provides an indication that the access terminal may continue with call setup and further wherein the access terminal provides a user name, responsive to the indication, to a network access server/packet data serving node (NAS/PDSN) and, based upon a received random number from the NAS/PDSN, provides second calculated answer.

3. The network of claim 2 wherein the NAS/PDSN provides the random number, user name and second calculated answer to a local AAA server which local AAA server determines whether access can be authorized and if so, wherein the access terminal establishes a packet data session with a packet data node (PDN) through NAS/PDSN as authorized by the local AAA.

4. The network of claim 1 wherein the AN-AAA server further includes logic to select among a plurality of algorithmic calculations according to the access terminal Id.

5. The network of claim 1 wherein the network access server is formed to transmit a challenge value to the user device and to receive a result there from.

6. The network of claim 5 wherein the network access server further is coupled to produce the challenge value, user name and result to a local AAA server and to receive an indication from the local AAA server an indication as to whether the calculated result produced by the access terminal matches an expected value.

7. An AN-AAA server, comprising:
processor circuitry for executing computer instructions stored in memory; and
a memory coupled to produce computer instructions to the processor circuitry, which computer instructions define operational logic for determine whether a data only access terminal requesting access to a 1xEVDO network is authorized to be given the requested access wherein the AN-AAA server responds with one of an authorization or denial of access message to the ANC based upon a received random number, access terminal ID, and access terminal calculated answer.

8. The AAA server of claim 7 wherein the computer instructions define a table that maps a list of authorized users to access terminal Ids.

9. The AN-AAA server of claim 7 further including computer instructions that define logic for receiving and processing a result produced by an access terminal requesting access.

10. The AN-AAA server of claim 9 further comprising computer instructions that define logic for receiving a random number from an access network controller of the 1xEVDO network.

11. The AN-AAA server of claim 10 further comprising computer instructions that define logic for performing an algorithmic calculation on the received random number.

12. The AN-AAA server of claim 10 further comprising computer instructions that define logic for comparing a result from the algorithmic calculation for the received random number to the received result produced by the access terminal.

13. The AN-AAA server of claim 12 further comprising computer instructions that define logic for generating a signal to an external network component indicating whether the access terminal is authorized to access the network based upon its access terminal Id.

14. The AN-AAA server of claim 13 further comprising computer instructions that define logic for generating a signal to an external network component indicating whether the access terminal is authorized to access the network based upon its access terminal Id and based upon the comparison of the received result from the access terminal to the calculated result.

15. A 1xEVDO data only access terminal, comprising:
communication circuitry for transmitting and receiving data over a wireless data network; and
logic for generating a stored access terminal Id to an access network controller as a part of or appended to call set up signals that are produced by the access terminal as a part of establishing a data call;

logic for receiving a test value and calculating an answer based up on the test value.

16. The access terminal of claim 15 further including logic for receiving a random number as the test value and for performing an algorithmic calculation on the random number to produce the answer.

17. The access terminal of claim 15 further including logic for receiving a random number and for performing an algorithmic calculation on the random number to produce a result and logic for transmitting the produced result to an access network controller.

18. A method for authenticating a mobile device in a wireless IP network, comprising:

receiving, in a 1xEVDO wireless data-only network access controller, an access request from a wireless access terminal;

sending a random challenge value to the access terminal;

receiving a computed authenticator and terminal ID from the access terminal;

producing the random challenge, an access terminal ID, and the computer authenticator to an AN-AAA server;

receiving an indication from the AN-AAA server that the access terminal is authorized; and granting access to the access terminal.

19. The method of claim 18 wherein the step of granting access includes transmitting the computed authenticator, access terminal ID and challenge value to a first authentication server.

20. The method of claim 19 wherein the first authentication server comprises an AN-AAA server.

21. The method of claim 20 wherein the step of transmitting includes the step of transmitting to the authentication server using AAA protocols.

22. The method of claim 20 further including the step of transmitting a user name, the challenge value and the computed authenticator to a second authentication server.

* * * * *